United States Patent
Takei

(10) Patent No.: US 7,760,953 B2
(45) Date of Patent: Jul. 20, 2010

(54) IMAGE PROCESSING APPARATUS AND METHOD, COMPUTER PROGRAM, AND STORAGE MEDIUM WITH VARIED BLOCK SHAPES TO EXECUTE MOTION DETECTION

(75) Inventor: Hirofumi Takei, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1177 days.

(21) Appl. No.: 11/362,880

(22) Filed: Feb. 28, 2006

(65) Prior Publication Data
US 2006/0204043 A1 Sep. 14, 2006

(30) Foreign Application Priority Data
Mar. 14, 2005 (JP) .............................. 2005-071737

(51) Int. Cl.
*G06K 9/46* (2006.01)
(52) U.S. Cl. .................... 382/236; 382/107; 348/155
(58) Field of Classification Search ................. 382/107, 382/236; 348/155
See application file for complete search history.

(56) References Cited

U.S. PATENT DOCUMENTS

| 5,926,209 A | | 7/1999 | Glatt ........................... 348/143 |
| 6,148,027 A | * | 11/2000 | Song et al. ................... 375/240 |
| 7,253,834 B2 | * | 8/2007 | Mihara et al. .......... 348/208.11 |
| 2004/0008772 A1 | * | 1/2004 | Kojima ................... 375/240.08 |
| 2005/0114093 A1 | * | 5/2005 | Cha et al. .................... 702/189 |
| 2006/0002474 A1 | * | 1/2006 | Au et al. ................ 375/240.16 |

FOREIGN PATENT DOCUMENTS

| EP | 0 865 208 A2 | 9/1998 |
| JP | 2001 145011 A | 5/2001 |
| JP | 2004-328633 | 11/2004 |

OTHER PUBLICATIONS

Chang, A., et al. "Fast Integer Motion Estimation for H.264 Video Coding Standard", 2004 IEEE International Conference on Multimedia and Expo (ICME), vol. 1, pp. 289-292, Jun. 27, 2004.
Patent Abstracts of Japan, vol. 2000, No. 22, Mar. 9, 2001.

* cited by examiner

*Primary Examiner*—Vikkram Bali
*Assistant Examiner*—Eueng-Nan Yeh
(74) *Attorney, Agent, or Firm*—Fitzpatrick, Cella, Harper & Scinto

(57) ABSTRACT

The image processing apparatus includes obtaining unit for obtaining moving image data having been obtained in shooting unit for shooting an object and shooting information relating to a condition of the shooting unit during the shooting, encoding unit for executing motion detection on the moving image data by unit of two or more kinds of pixel block shapes and encoding the data, and decision unit for deciding, based on the shooting information, whether to execute motion detection using all the kinds of pixel block shapes, wherein when the decision unit decides that motion detection should not be executed using all the kinds of pixel block shapes, the encoding unit executes the motion detection using some of the kinds of pixel block shapes.

21 Claims, 13 Drawing Sheets

FIG. 13A
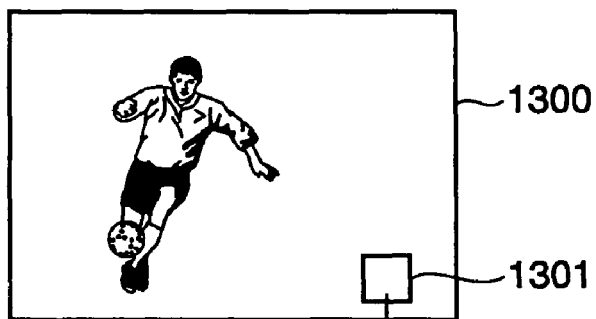
FIG. 13B
MACRO BLOCK PARTITION TYPE
16×16 PIXELS     16×8 PIXELS     8×16 PIXELS     8×8 PIXELS
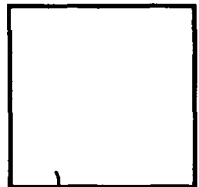 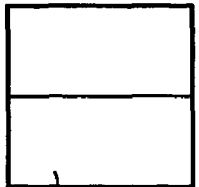 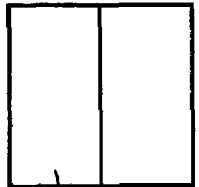 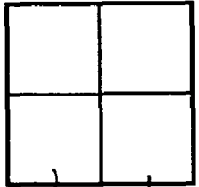
1302        1303        1304        1305
FIG. 13C
SUB MACRO BLOCK PARTITION TYPE
8×4 PIXELS     4×8 PIXELS     4×4 PIXELS
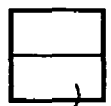 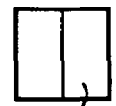 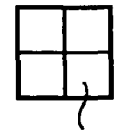
1306        1307        1308

IMAGE PROCESSING APPARATUS AND METHOD, COMPUTER PROGRAM, AND STORAGE MEDIUM WITH VARIED BLOCK SHAPES TO EXECUTE MOTION DETECTION

FIELD OF THE INVENTION

The present invention relates to an image processing apparatus and method, a computer program, and a storage medium.

BACKGROUND OF THE INVENTION

Encoding methods such as JPEG, MPEG1 and MPEG2 have been established as techniques for high-efficiency encoding of images. Manufactures have developed and commercialized shooting apparatuses such as a digital camera and a digital video camera or DVD recorders in which images can be recorded using these encoding methods. Users can easily view images through these apparatuses, personal computers, or DVD players.

Further, encoding methods for moving images have been studied to obtain a higher compression than MPEG1 and MPEG2. In recent years, an encoding method called H.264/MPEG-4 part 10 (hereinafter referred to as H.264) has been standardized by International Telecommunication Union-Telecommunication Standardization Sector (ITU-T) and International Organization for Standardization (ISO).

Referring to the block diagram of FIG. 11, the following will describe a typical overall configuration of a moving image compression encoding apparatus in H.264. The moving image compression encoding apparatus comprises a camera unit 200, a subtraction unit 2001, an integer transformation unit 2002, a quantization unit 2003, an entropy encoder 2004, an invert-quantization unit 2005, an invert integer transformation unit 2006, an adder 2007, frame memories 2008 and 2012, an intra prediction unit 2009, switches 2010 and 2015, a de-blocking filter 2011, an inter prediction unit 2013, and a motion detector 2014. Image data inputted from the camera unit 200 is divided to form blocks, encoding processing is performed on each block, and then encoded data is outputted. The following will discuss encoding processing of H.264.

First, the subtraction unit 2001 subtracts prediction image data from image data having been inputted from the camera unit and outputs differential image data. The generation of prediction image data will be discussed later. The integer transformation unit 2002 performs orthogonal transformation on the differential image data having been outputted from the subtraction unit 2001 according to DCT or the like and outputs a transformation coefficient. Then, the quantization unit 2003 quantizes the transformation coefficient by using a predetermined quantization parameter. The entropy encoder 2004 is fed with the transformation coefficient having been quantized by the quantization unit 2003, performs entropy coding on the transformation coefficient, and outputs the coefficient as encoded data.

On the other hand, the transformation coefficient having been quantized by the quantization unit 2003 is also used for generating prediction image data. The invert-quantization unit 2005 invert quantizes the transformation coefficient having been quantized by the quantization unit 2003. Further, the invert integer transformation unit 2006 performs invert integer transformation according to inverse DCT transformation or the like on the transformation coefficient having been invert quantized by the invert-quantization unit 2005, and outputs the coefficient as decoded differential image data. The adder 2007 adds the decoded differential image data and the prediction image data and outputs the data as reconstruction image data.

The reconstruction image data is recorded in the frame memory 2008. When de-blocking filter processing is performed, the reconstruction image data is recorded in the frame memory 2012 through the de-blocking filter 2011. When de-blocking filter processing is not performed, the reconstruction image data is recorded in the frame memory 2012 without passing through the de-blocking blocking filter 2011. The switch 2010 is a selection unit for selecting whether to perform de-blocking filter processing. In the reconstruction image data, data which may be referred in the second prediction and later is stored as reference frame data in the frame memory 2008 or 2012 for a while. The de-blocking filter 2011 is used for removing noise.

The intra prediction unit 2009 performs intra-frame prediction using the image data recorded in the frame memory 2008 and generates prediction image data. The inter prediction unit 2013 performs inter-frame prediction using the reference frame data recorded in the frame memory 2012, based on motion vector information detected by the motion detector 2014, and generates prediction image data. The motion detector 2014 detects a motion vector in inputted image data and outputs information relating to the detected motion vector to the inter prediction unit 2013 and the entropy encoder 2004. The switch 2015 is a selection unit for selecting whether to use intra prediction or inter prediction. The switch 2015 selects one of outputs from the intra prediction unit 2009 and the inter prediction unit 2013 and outputs the selected prediction image data to the subtraction unit 2001 and the adder 2007. The above explanation described the image compression encoding apparatus shown in FIG. 11.

The following will discuss the operations of the motion detector 2014 in H.264. In H.264, as shown in FIG. 12, a reference frame with high encoding efficiency is selected from a plurality of reference frames (RF1 to RF5) for each macro block in a current frame (CF) and the frame to be used can be designated. In this case, two or more reference frames may be selected for a macro block in the current frame CF or a different reference frame may be selected even in the macro block of the same frame.

One macro block in an image of FIG. 13A is divided into 16×16 pixels, 16×8 pixels, 8×16 pixels, or 8 ×8 pixels as shown in FIG. 13B. A motion vector and a reference frame can be separately obtained in each macro block partition. In the case of 8×8 pixels, each macro block partition can be further divided into sub macro block partitions of 8×4 pixels, 4×8 pixels, and 4×4 pixels as shown in FIG. 13C. The accuracy of the motion vector can be also decided by 6-tap FIR filter processing with 1/4 pixel accuracy (Japanese Patent Laid-Open No. 2004-328633).

As described above, in H.264, the technique shown in FIGS. 13A to 13C is introduced: a plurality of pixel block shapes are prepared for predictive encoding and motion detection in fine pixels is executed. In this case, the finer the pixel blocks, the number of blocks for predictive encoding increases. Further, as shown in FIG. 12, in order to select a reference image frame with high encoding efficiency from a plurality of frames, it is necessary to perform inter-frame prediction on all the plurality of candidate reference frames, thereby increasing a processing load.

However, in some states of the camera unit for outputting image data to be compressed, it may not be necessary to perform motion detection using all the kinds of pixel block shapes. For example, when focus is not achieved or the camera unit pans or tilts, image data entirely blurs or an extreme motion occurs. Thus, correct motion information cannot be detected even by motion detection using fine pixel block shapes.

Similarly when an image is dark or much noise occurs in image data due to a high amplifier gain of a camera, in many cases, correct motion information cannot be detected even by motion detection using fine pixel block shapes. Immediately after the startup of the camera unit, in many cases, since the camera has an unstable angle of view or an unstable exposure level, correct motion information cannot be detected even by motion detection using fine pixel block shapes.

In a video camera system in growing demand, which records high-quality image data in a more compact form using such an encoding algorithm, unnecessary motion detection directly leads to an increase in battery consumption for driving mobile computing devices. This seriously interferes with a long shooting time. Further, when the encoding algorithm is implemented in software, processing time is unnecessarily increased.

SUMMARY OF THE INVENTION

An invention according to an example of embodiments of the present invention, comprising obtaining unit for obtaining moving image data having been obtained in shooting unit for shooting an object and shooting information relating to a condition of the shooting unit during the shooting, encoding unit for executing motion detection on the moving image data by unit of two or more kinds of pixel block shapes and encoding the data, and determination unit for deciding, based on the shooting information, whether to execute motion detection using all the kinds of pixel block shapes, wherein when the determination unit determines that motion detection should not be executed using all the kinds of pixel block shapes, the encoding unit executes the motion detection using some of the kinds of pixel block shapes.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 13A to 13C are diagrams showing a division pattern of macro blocks and sub macro block partitions for predictive encoding.

DETAILED DESCRIPTION OF THE PREFERRED EMBODIMENTS

Preferred embodiments of the present invention will now be described in detail in accordance with the accompanying drawings.

First Embodiment

Figure 1:
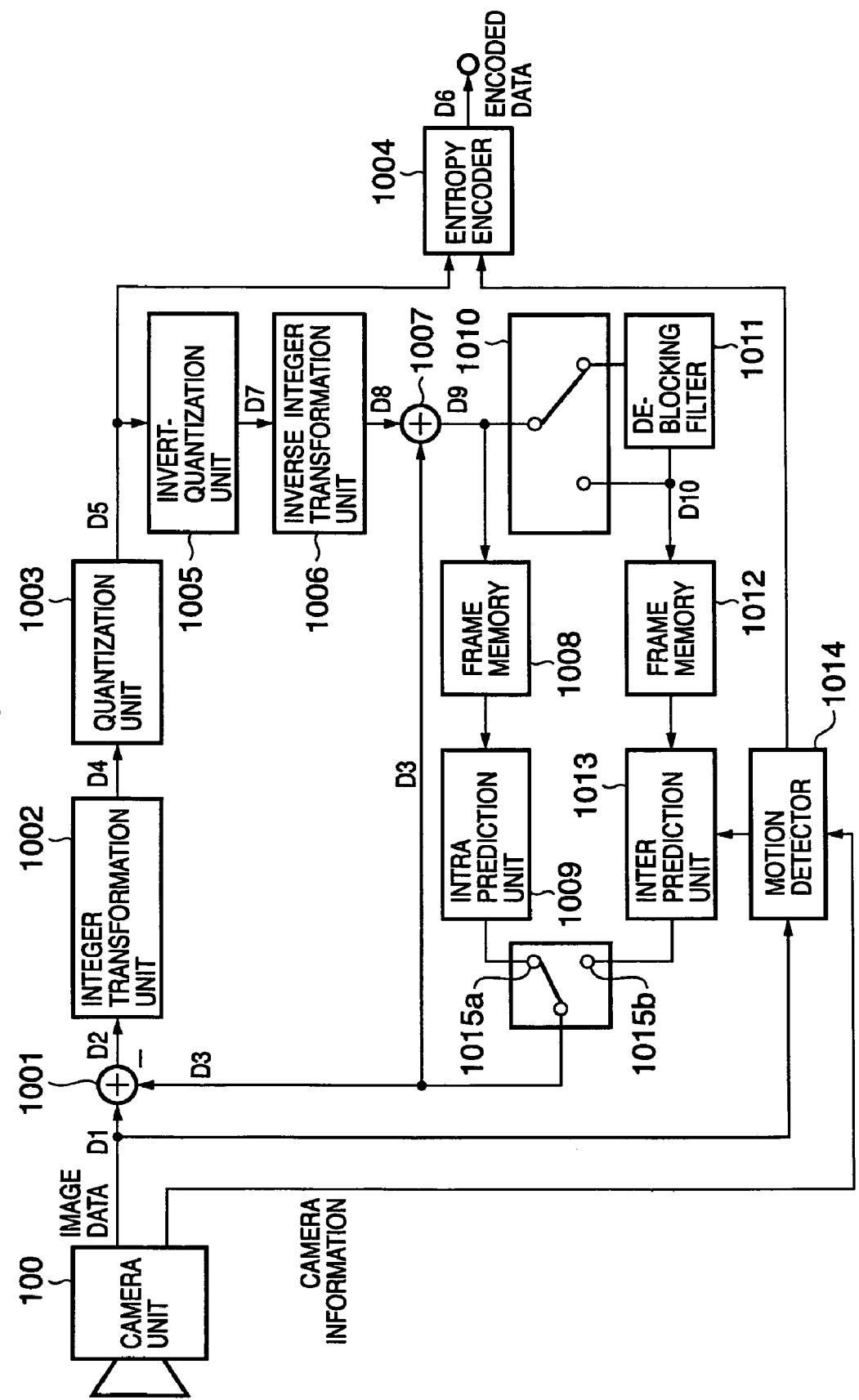
FIG. 1 is a block diagram showing an example of the configuration of an image processing apparatus according to an embodiment of the present invention.

First Embodiment of the present invention will be described below. FIG. 1 is a block diagram showing the configuration of an image processing apparatus to which the present invention is applied. In FIG. 1, reference numeral 100 denotes a camera unit which serves as shooting unit for shooting an object and outputting image data and camera information. In the present embodiment, the image processing apparatus may include the camera unit 100 or may be connected to the camera unit 100.

Figure 2:
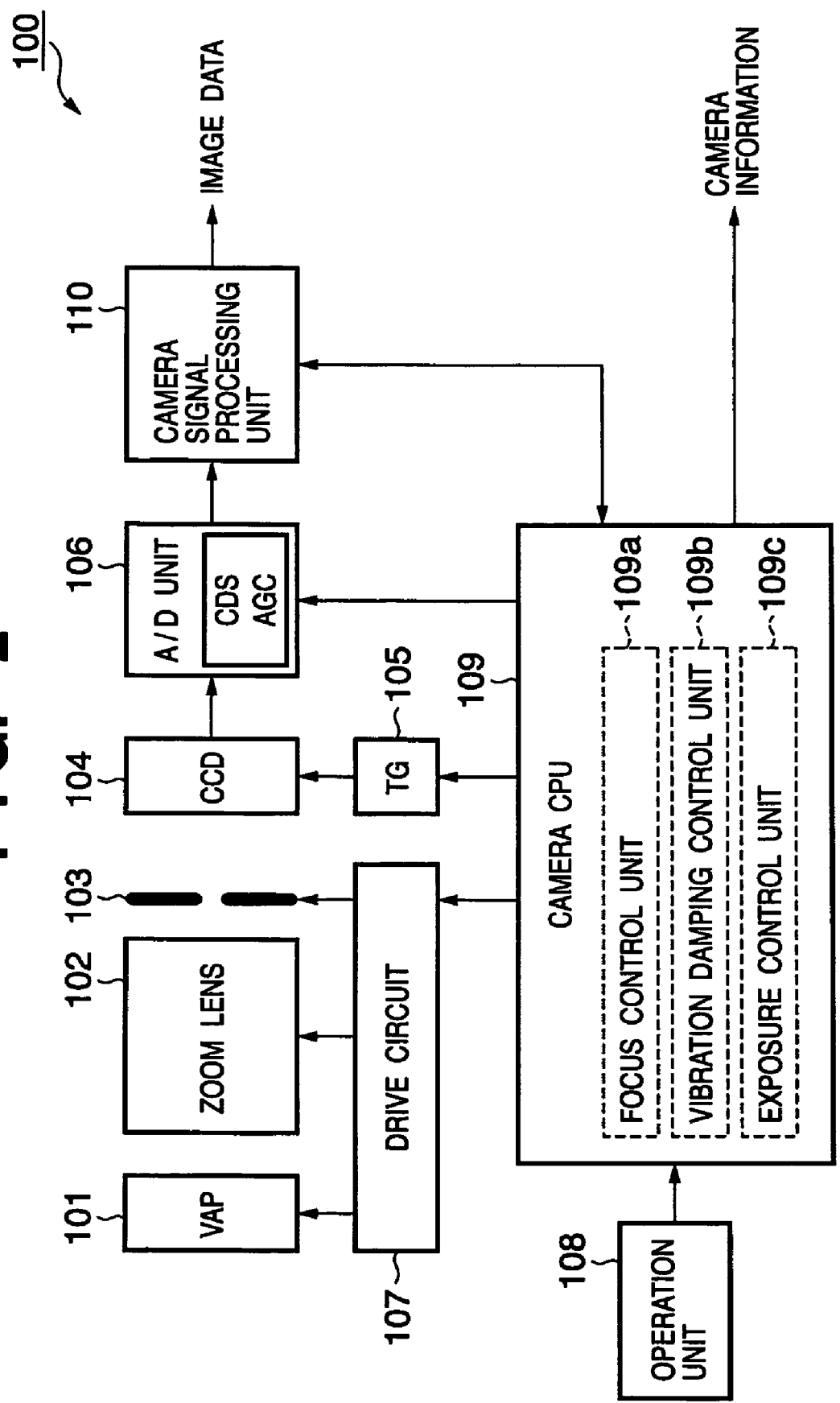
FIG. 2 is a block diagram showing an example of the configuration of a camera unit 100 according to the embodiment of the present invention.

Referring to FIG. 2, the configuration of the camera unit 100 will be discussed below. In FIG. 2, on an optical image of an object, vibrations caused by the movement of the hands of a photographer are optically corrected by a variangle prism (hereinafter referred to as VAP) denoted as 101. Then, a zoom lens denoted as 102 performs zooming and adjusts focus. Then, a light quantity is adjusted through a diaphragm 103 and an image is formed on a CCD 104.

The CCD is driven by a timing generator (hereinafter referred to as TG), which is denoted as 105, with a predetermined shutter speed. A signal from the CCD 104 undergoes correlation dual sampling (CDS), auto gain control (AGC), and A/D conversion in an A/D unit denoted as 106. Reference numeral 107 denotes a drive circuit for driving the VAP 101. the zoom lens 102, and the diaphragm 103.

Reference numeral 108 denotes an operation unit including switches for performing various operations on the camera unit 100 and reference numeral 109 denotes a camera CPU for controlling the overall camera unit 100 in an integrated manner. Reference numeral 110 denotes a camera signal processing unit which performs processing such as color interpolation, γ correction, and level adjustment of color signals on image data having been A/D converted in the A/D unit 106 and outputs camera image data. The camera CPU 109 has a camera control module for exercising kinds of control on the camera unit (101 to 110 in FIG. 2) in a shooting apparatus.

A focus control unit 109a in the camera CPU 109 outputs, to the drive circuit 107, a lens control signal for controlling the zoom lens 102 and performing focus adjustment and zoom adjustment. A vibration damping control unit 109b decides the vibration components of the camera unit 100 according to known methods such as image processing and a gyro sensor (not shown) and outputs a vibration damping control signal for controlling the VAP lens 101 to the drive circuit 107. An exposure control unit 109c controls the diaphragm, the shutter speed of the CCD, and auto gain control (AGC) such that a video signal has a proper exposure level. An exposure control signal is outputted to the drive circuit 107, the TG 105, and the A/D unit 106.

Control information relating to these control modules is also outputted to the image processing apparatus (described later) as camera information relating to the states of the camera unit 100 upon shooting. Referring to FIGS. 1 and 3 to 5B, the following will describe the operations of the image processing apparatus using this camera information according to the present invention.

In FIG. 1, reference numeral 1001 denotes a subtraction unit for subtracting prediction image information (described later). Reference numeral 1002 denotes an orthogonal transformation unit for performing integer orthogonal transformation of 4×4 on difference data of an image through DCT transformation or the like. Reference numeral 1003 denotes a quantization unit for quantizing a transformation coefficient, which has undergone integer orthogonal transformation, with a predetermined quantization scale. Reference numeral 1004 denotes an entropy encoder which performs entropy encoding on a quantized transformation coefficient and compresses data.

Reference numeral 1005 denotes an invert-quantization unit for performing predetermined invert quantization on a quantized transformation coefficient. Reference numeral 1006 denotes an inverse orthogonal transformation unit which performs inverse integer orthogonal transformation for returning an invert quantized transformation coefficient to the original image data space through inverse DCT transformation or the like. Reference numeral 1007 denotes an addition unit for adding prediction image information to image difference information having been returned to the image data space. Reference numeral 1008 denotes a frame memory for storing image data which has been encoded in the current frame and storing reference data during intra-frame predictive encoding. Reference numeral 1009 denotes an intra prediction data generation unit for generating prediction data from image data stored in the frame memory 1008.

Reference numeral 1011 denotes a de-blocking filter unit for correcting discontinuity of boundary data in predetermined blocks of image data having been restored by the adder 1007. Reference numeral 1012 denotes a frame memory for storing restored image data, which has undergone block boundary correction, to use the image data as a reference image of prediction image information. The present embodiment described an example compliant with H.264 and thus the frame memory 1012 has a capacitance for storing image data of up to five frames.

Reference numeral 1014 denotes a motion detector which divides the current input image data into a plurality of macro block shapes, conducts a motion search for a position highly correlated with a reference frame in each macro block shape, and detects difference data on the position as motion information between frames. Reference numeral 1013 denotes an inter prediction unit which generates, from reference frames (five frames) in the frame memory 1012, prediction image information relating to data of a target block in the current frame based on information from the motion detector 1014, and outputs the prediction image information.

Reference numeral 1015 denotes a switch unit for selecting prediction information. The switch 1015 selects one of input terminals 1015a and 1015b with predetermined timing. When the input terminal 1015a is selected, intra(intra-frame) predictive encoding is performed. When the input terminal 1015b is selected, inter(inter-frame) predictive encoding is performed.

Functions corresponding to the blocks of 1001 to 1015 can be obtained by, for example, executing programs corresponding to the functions in a CPU of the image processing apparatus. Alternatively, the functions can be obtained as hardware modules specifically designed for implementing the functions. Further, the functions can be obtained as programmable logic circuits which are programmed to implement the functions.

First, the following will discuss the operations of the overall image processing apparatus according to the present embodiment. A subtraction is performed by the subtraction unit 1001 on image data (D1) inputted from the camera unit 100 with prediction image information (D3), and difference data (D2) from prediction image information is generated. The difference data (D2) is subjected to integer orthogonal transformation in the transformation unit 1002 through DCT transformation or the like, and is orthogonally transformed from a typical image space to the space of a transformation coefficient having highly concentrated energy (D4). The transformation coefficient of the transformed difference data (D4) is quantized in the quantization unit 1003 with a predetermined step width according to an orthogonal transformation component (D5). The quantized transformation coefficient data (D5) is compression encoded in the entropy encoder 1004 (D6). Further, in the entropy encoder 1004, the identifier of a frame number referred in inter encoding (described later) is also multiplexed and compression encoded.

The following will discuss the processing of prediction image information. Two methods are available for generating prediction image information: intra predictive encoding method of generating prediction image information from data in the current image upon input, and inter encoding method of generating prediction image information from frame image data other than the current image upon input.

First, the following will discuss intra predictive encoding method with processing closed in the current image. The transformation coefficient (D5) having been quantized in the quantization unit 1003 of FIG. 1 is invert quantized in the invert-quantization unit 1005 to restore the transformation coefficient (D7). The restored transformation coefficient (D7) is returned to the original image data space through inverse DCT transformation or the like in the inverse orthogonal transformation unit 1006, and restored as difference data (D8) from prediction image information. The prediction image information (D3) from which the difference data is generated by the subtraction unit 1001 is added to the restored difference data (D8) in the adder 1007, so that restored image data (D9) of an encoding target block is obtained. Although the restored image data (D9) at this point corresponds to the input image data (D1), the image data (D9) is slightly degraded from the input image data (D1) due to an error of prediction information (discussed later) and a quantization error in quantization.

The restored image data (D9) is temporarily stored in the frame memory 1008. The restored image data (D9) stored in the frame memory 1008 is divided into predetermined blocks in the intra prediction encoder 1009 and used for generating prediction image information relating to the input image data (D1) of an encoding target block inputted thereafter. The prediction image information obtained in the intra prediction encoder 1009 is transmitted to the switch unit 1015.

In the switch unit 1015, switching is performed by a controller (not shown) according to a prediction method of prediction image information. In the case of the foregoing intra predictive encoding method, the switch is connected to 1015*a* and data obtained by a calculation of intra prediction method is transmitted as prediction image information. The prediction image information of intra method is transmitted to the subtraction unit 1001 and the adder 1007 and used for transforming image data and prediction image difference data.

The following will discuss inter encoding prediction method of generating prediction image information by using a different reference frame image from the current image.

Processing until the adder 1007 is similar to that of intra predictive encoding method and thus the explanation thereof is omitted. The restored image data (D9) obtained in the adder 1007 is transmitted to a de-blocking filter unit 1011 to eliminate discontinuity of data on a boundary of each block (described later). The de-blocking filter unit 1011 performs predetermined filtering on pixel data adjacent to a block boundary to reduce discontinuity of data on the block boundary.

As described above, the image data (D9) restored in the adder 1007 is degraded from the input image. Particularly in the case of image data processed in predetermined units of blocks in each processing step, discontinuity tends to occur on a block boundary and thus the image data is recognized as block distortion. In this case, block distortion is reduced by filtering in the de-blocking filter unit 1011. The restored image data (D10) having undergone boundary processing is temporarily stored in the frame memory 1012. The frame memory 1012 can store restored image data of a plurality of frames (five frames in the present embodiment).

Meanwhile, the motion detector 1014 divides an inputted image (D1) into predetermined units of blocks and searches for positions strongly correlated with a plurality of reference frames.

Figure 12:
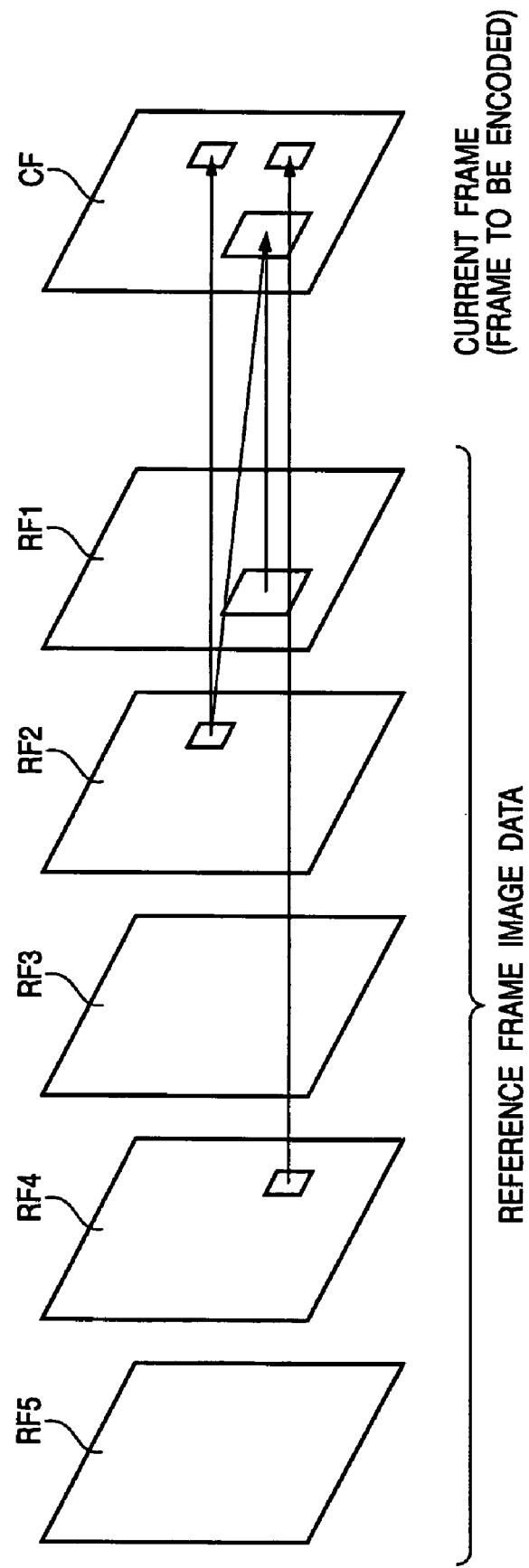
FIG. 12 is a diagram for explaining a concept for detecting motion information from a plurality of reference frames.

As described in the conventional example of FIG. 12, in H.264, it is possible to select a reference frame with high encoding efficiency from a plurality of reference frames for each macro block and designate a frame to be used.

In the image of FIG. 13A, a macro block 1301 in the image is divided into pixel block shapes (macro block partitions) shown in FIG. 13B. The divided pixel block shapes include 16×16 pixels (1302), 16×8 pixels (1303), 8×16 pixels (1304), and 8×8 pixels (1305). Moreover, it is possible to separately obtain a motion vector and a reference frame for each divided macro block partition. When a macro block partition has 8×8 pixels (1305), the macro block partition (8×8 pixels) can be further divided into sub macro block partitions of 8×4 pixels (1306), 4×8 pixels (1307), and 4×4 pixels (1308) as shown in FIG. 13C.

In the motion detector 1014, difference data between the most strongly correlated position and the block position of the current processing is transmitted as motion information to the inter prediction unit 1013 and the entropy encoder 1004. Further, the identification information of a reference frame having been used for generating motion information is simultaneously transmitted to the inter prediction unit 1013 and the entropy encoder 1004.

In the inter prediction unit 1013, the restored image data of a reference frame corresponding to reference frame identification information is invoked from the frame memory 1012 and the prediction image information of the current image is predicted from the restored image data and motion information.

In this way, inter predictive encoding is different from intra predictive encoding in that a different frame from the current image is referred to generate prediction image information.

The prediction image information generated by inter predictive encoding is connected to 1015*b* in the switch unit 1015, transmitted to the subtraction unit 1001 and the adder 1007, and used for transforming image data and prediction image difference data.

The image data (D1) inputted from the camera unit 100 is compression encoded thus. In this processing, the calculation of motion detection information in the motion detector 1014 is relatively heavy processing and a characteristic of the present embodiment. Referring to the flowchart of FIG. 3, the calculation of motion detection information will be discussed below according to the present embodiment.

At the start of motion detection, in step S301, it is determined whether detection is the first motion detection in a current frame. In other words, in this step, it is determined whether detection is the motion detection of the first macro block in the current frame. When it is determined that detection is not the first motion detection ("NO" in step S301), the process proceeds to step S310. When it is determined that detection is the first motion detection in a new image frame ("YES" in step S301), the process proceeds to step S302 to read camera information relating to focus control, image vibration damping control, exposure control, and so on from the camera unit 100.

In step S303, it is determined whether focus is achieved or not, based on focus control information in the camera information having been read in step S303. When focus is achieved ("NO" in step S303), the process proceeds to step S304. When focus is not achieved ("YES" in step S303), the process proceeds to step S309.

For example, whether focus is achieved or not can be determined as follows; first, the camera CPU 109 passes image data, which has been obtained from a camera signal processing unit 110, through a high-pass filter allowing only the passage of high-frequency components. Then, a focus state can be determined based on an integral (hereinafter referred to as a "high-pass filter integral") of an output signal which is outputted from the high-pass filter and corresponds to one screen. To be specific, when focus is not achieved and an image is entirely blurred, an image signal includes just a few high-frequency components.

Thus, output from the high-pass filter decreases and the high-pass filter integral also decreases. When focus is achieved, an image is entirely clear and thus an image signal includes a number of high-frequency components. Thus, output from the high-pass filter increases and the high-pass filter integral also increases. In this way, a high-pass filter integral is used as focus control information. When the integral is larger than a predetermined threshold value, it is determined that focus is achieved. When the integral is smaller than the predetermined threshold value, it is determined that focus is not achieved.

In step S304, it is determined whether the camera unit 100 pans or tilts, based on information relating to image vibration damping control. When the camera unit 100 does not pan or tilt ("NO" in step S304), the process proceeds to step S305. When the camera unit 100 pans or tilts ("YES" in step S304), the process proceeds to step S309.

For example, by using output from the gyro sensor (not shown in FIG. 2) of the camera unit 100, whether the camera unit 100 pans or tilts can be determined as follows: the gyro sensor is generally used for detecting vibration to compensate for camera shake. Two gyro sensors for detecting a vertical rotation component and a horizontal rotation component are attached to the camera unit 100. Upon shooting, when camera shake is caused by a photographer, periodic vertical and horizontal rotation components are usually detected in the gyro sensors. When the camera unit 100 pans or tilts, periodic rotation components are not detected in the gyro sensors but rotation components in a fixed direction are sequentially detected.

In other words, when rotation components in the upward direction are sequentially detected, it is determined that the camera unit 100 tilts upward. When rotation components on the right are sequentially detected, it is determined that the camera unit 100 pans to the right. When rotation components in a fixed direction are sequentially detected for a predetermined time or longer by using output from gyro sensors, it is determined that the camera unit 100 pans or tilts.

Even when periodic rotation components of camera shake are detected, in the presence of a period larger than a predetermined value or a rotation component larger than the predetermined value, it may be determined that camera shake does not occur but the camera unit 100 pans or tilts.

In step S305, it is determined whether an object has a low brightness or not, based on information relating to exposure control. When an object does not have a low brightness ("NO" in step S305), the process proceeds to step S306. When an object has a low brightness ("YES" in step S305), the process proceeds to step S309.

At this point, whether an object has a low brightness or not can be determined by using, for example, an integral of brightness signal components of one screen in an image signal (hereinafter referred to as a "luminance integral"). In other words, when the luminance integral is smaller than a predetermined threshold value, it is determined that an object has a low brightness.

In step S306, it is determined whether the camera unit 100 gains up or not, based on information relating to exposure control. When the camera unit 100 does not gain up ("NO" in step S306), the process proceeds to step S307. When the camera unit 100 gains up ("YES" in step S306), the process proceeds to step S309.

At this point, whether the camera unit 100 gains up or not can be determined by using, for example, control information from auto gain control (AGC) 106 of the camera unit 100 shown in FIG. 2. Generally, when an object is dark and the diaphragm of a lens is opened but an image signal has a low level, the amplification rate (gain) of AGC is increased to electrically raise the level of the image signal, in other words, the camera unit 100 gains up. That is, when control information to AGC is examined and the amplification rate of AGC is found to be higher than a predetermined value, it is determined that the camera unit 100 gains up.

In step S307, it is determined whether the camera unit 100 is in a state immediately after startup, based on information relating to the startup time of the camera unit. When the camera unit 100 is not in a state immediately after startup ("NO" in step S307), the process proceeds to step S308. When the camera unit 100 is in a state immediately after startup ("YES" in step S307), the process proceeds to step S309.

At this point, whether the camera unit is in a state immediately after startup can be determined by using, for example, a timer (not shown in FIG. 2) in the camera CPU 109 of FIG. 2. To be specific, when the camera unit 100 is started, in other words, when power is fed to the camera CPU 109, the timer is reset by resetting in the camera CPU 109. The timer is set beforehand so as to automatically count up with the passage of time. In this case, the value of the timer having counted up in the camera CPU 109 is checked. When the timer has a value smaller than a predetermined value, it is determined that the camera unit is in a state immediately after startup.

In step S309, when it is determined in steps S303 to S307 that the camera unit 100 is out of focus, pans/tilts, has a low-brightness object, gains up, or is in a state immediately after startup, "sub macro block partition use permission flag" is set at prohibition (Lo). "Sub macro block partition use permission flag" permits motion detection using a sub macro block partition of FIG. 13C.

When it is determined in steps S303 to S307 that the camera unit 100 is out of focus, does not pan/tilt, does not have a low-brightness object, does not gain up, or is not in a state immediately after startup, the process proceeds to step S308. In step S308, "sub macro block partition use permission flag" is set at permission (Hi).

In this way, in steps S303 to S309 of the present embodiment, it is determined based on camera information whether to execute motion detection using all the kinds of pixel block shapes, in other words, whether to execute motion detection using only some of the kinds of pixel block shapes.

In the present embodiment, camera information is read and "sub macro block partition use permission flag" is set one time for one frame image data. An interval of reading camera information is not particularly limited. For example, camera information may be read once every several frames.

At the completion of setting "sub macro block partition use permission flag" for an encoding target image frame, the process proceeds to step, S310. In step S310, motion detection is executed using a macro block of 16×16 pixels.

In this motion detection, motion detection is executed on all reference frames where predictive encoding blocks can be referred. According to the standard of H.264, motion detection is executed on five reference frames at the maximum. Motion information relating to integer pixel accuracy, motion information relating to semi-pixel accuracy, and motion information relating to 1/4 pixel accuracy are calculated for each reference frame. The information with the strongest correlation is selected as the motion information of each frame. When the motion information of all reference frames is calculated, the motion information is evaluated for each reference frame. The information with the strongest correlation is selected to determine motion information MV1 of a predictive encoding block.

Similarly in step S311, motion detection is executed using a macro block partition of 16×8 pixels to determine motion information MV2. In step S312, motion detection is executed using a macro block partition of 8×16 pixels to determine motion information MV3. Further, in step S313, motion detection is executed using a macro block partition of 8×8 pixels to determine motion information MV4.

Then, in step S314, it is determined whether the state of "sub macro block partition use permission flag" is a permission state (Hi) or a prohibition state (Lo). When "sub macro block partition use permission flag" is in the permission state (Hi) ("YES" in step S314), the process proceeds to step S315. In step S315, motion detection is executed using a sub macro block partition of 8×4 pixels to determine motion information MV_S1. In subsequent step S316, motion detection is executed using a sub macro block partition of 4×8 pixels to determine motion information MV_S2. In step S317, motion detection is executed using a sub macro block partition of 4×4 pixels to determine motion information MV_S3.

When "sub macro block partition use permission flag" is in the prohibition state (Lo) ("NO" in step S314), the process proceeds to step S318. At this point, motion detection using the sub macro block partitions in steps S315 to S317 is not executed.

According to the present embodiment, when the camera unit 100 is out of focus, pans/tilts, has a low-brightness object, gains up, or is in a state immediately after startup, correct motion information cannot be obtained even by motion detection using sub macro block partitions of fine shapes, and thus control is executed to suspend the motion detection.

Thereafter, in step S318, evaluations are made on the motion information MV1 to MV4 which have been determined using the macro block partitions in steps S310 to S313 and the information MV_S1 to MV_S3 which have been determined using the sub macro block partitions in steps S315 to S317 when "sub macro block partition use permission flag" is in the permission state (Hi).

In these evaluations, a macro block strongly correlated with a reference frame and one kind of sub macro block partition is selected at the calculation of the motion information MV1 to MV4 and SMV1 to SMV3. When the motion information is properly selected, a reference list is produced based on the motion information in the selected macro block partition in step S319 to manage the reference relationship of all the predictive encoding blocks. When this processing is performed on all the pixels of the target frame, the motion detection of one frame is completed.

As described above, according to the present embodiment, when it is determined based on information from the camera unit 100 that the camera unit 100 is out of focus, pans/tilts, has a low-brightness object, gains up, or is in a state immediately after startup and correct motion information cannot be obtained even by motion detection using fine sub macro block partitions, it is possible to reduce unnecessary motion detection. Therefore, the processing load of motion detection can be reduced.

According to the present embodiment, in FIG. 1, camera information is directly inputted to the motion detector 1014 separately from image data outputted from the camera unit 100. Moreover, the configuration of FIG. 4 may be used: a multiplexing unit 401 and a demultiplexing unit 402 are disposed on the output side of a camera unit 100, camera information outputted from the camera unit 100 is used as additional data of image data and multiplexed in the multiplexing unit 401, and then the camera information is separated from the image data in the demultiplexing unit 402.

Further, in the image processing apparatus according to the present embodiment, it is not always necessary to directly input image data and corresponding camera information from the camera unit 100 as shown in FIG. 1 as long as the image data and the camera information can be used in encoding compression. Thus, the configuration of FIGS. 5A and 5B may be used: image data shot by a camera unit 100 and camera information used as additional data corresponding to the image data are recorded on a recording medium 501, and the image data and the camera information are read from the recording medium 501 to perform encoding compression.

Figure 3:
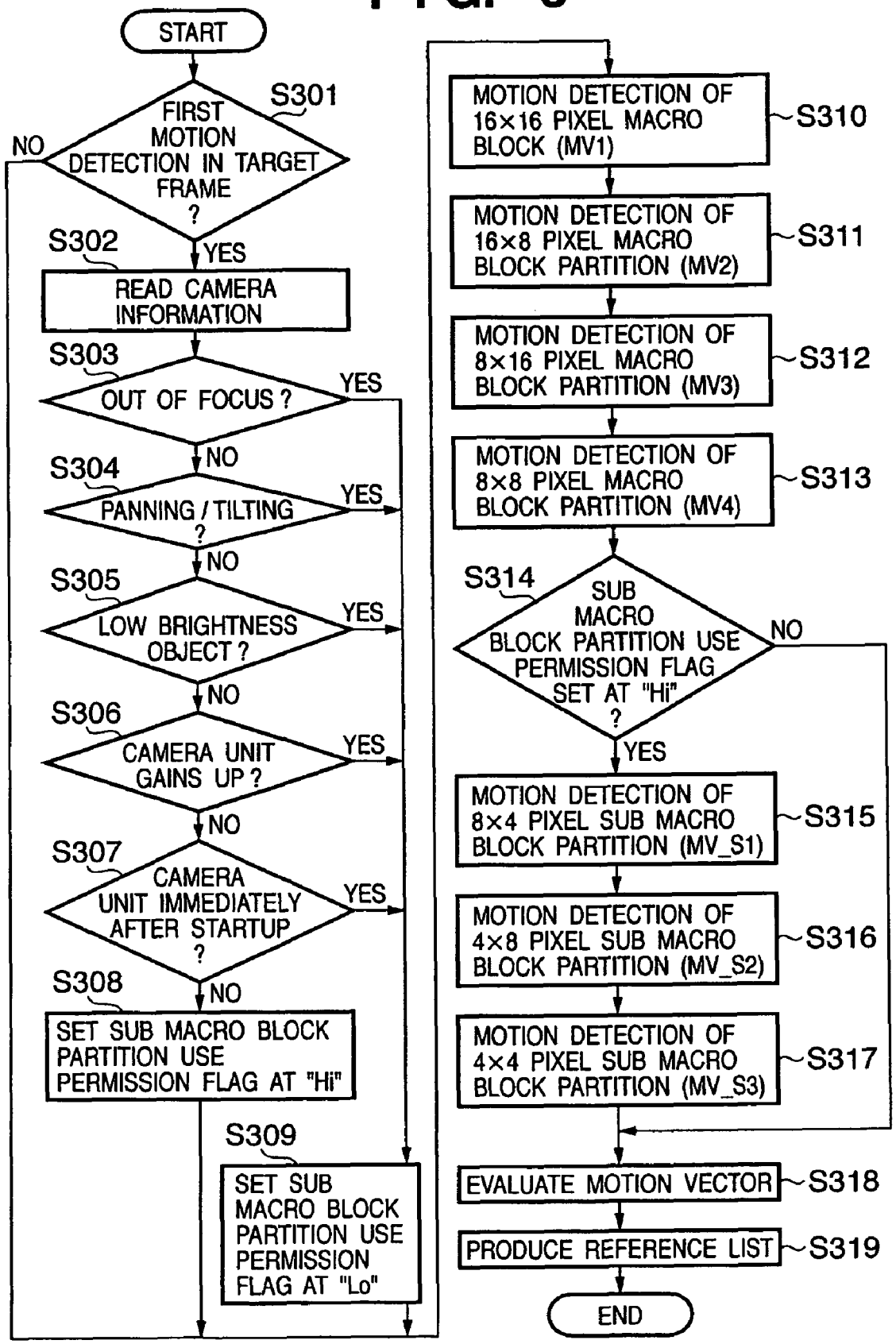
FIG. 3 is a flowchart corresponding to an example of motion detection according to First Embodiment of the present invention.
Figure 4:
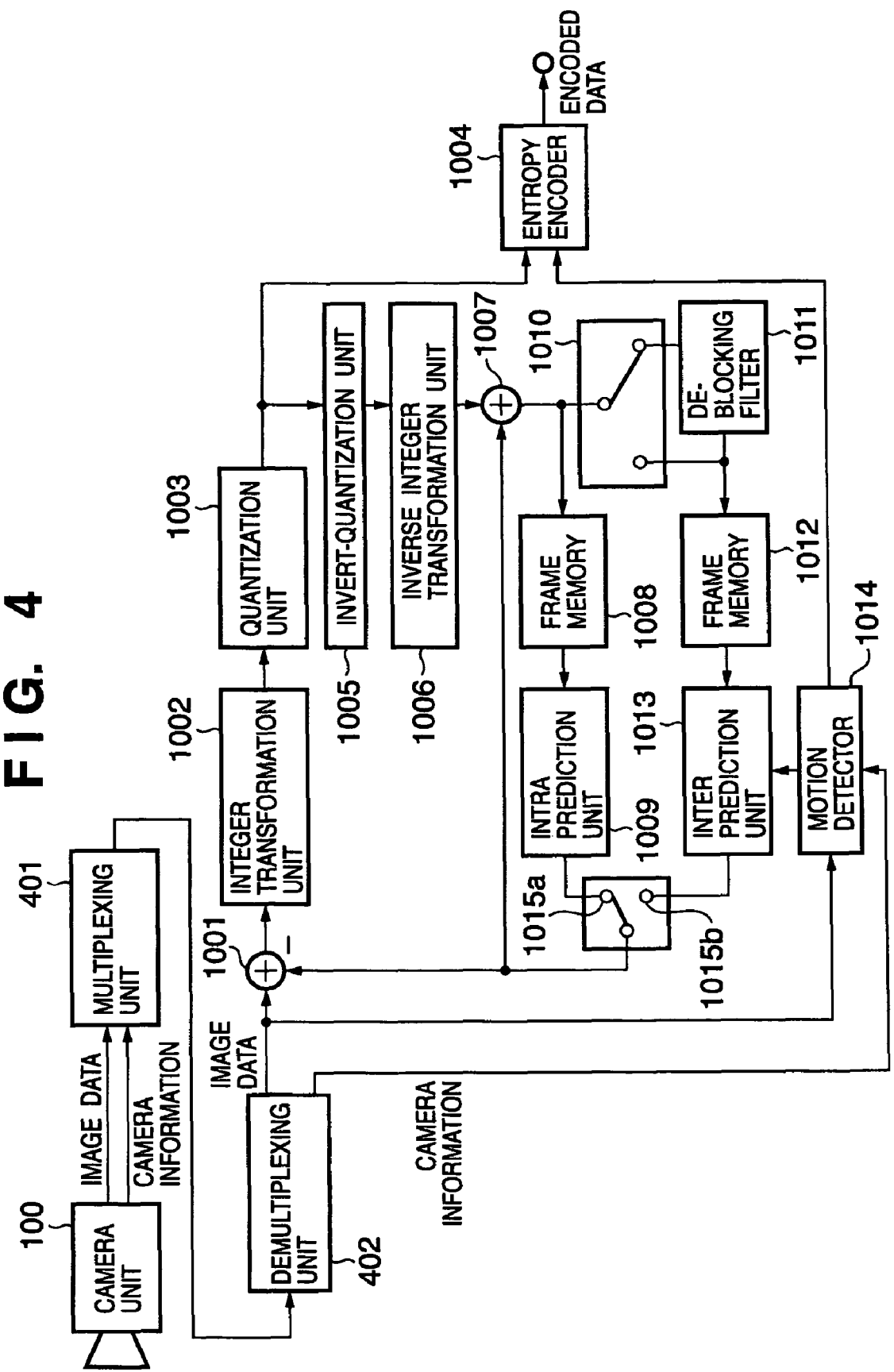
FIG. 4 is a block diagram showing another structural example of the image processing apparatus according to the embodiment of the present invention.
Figure 5:
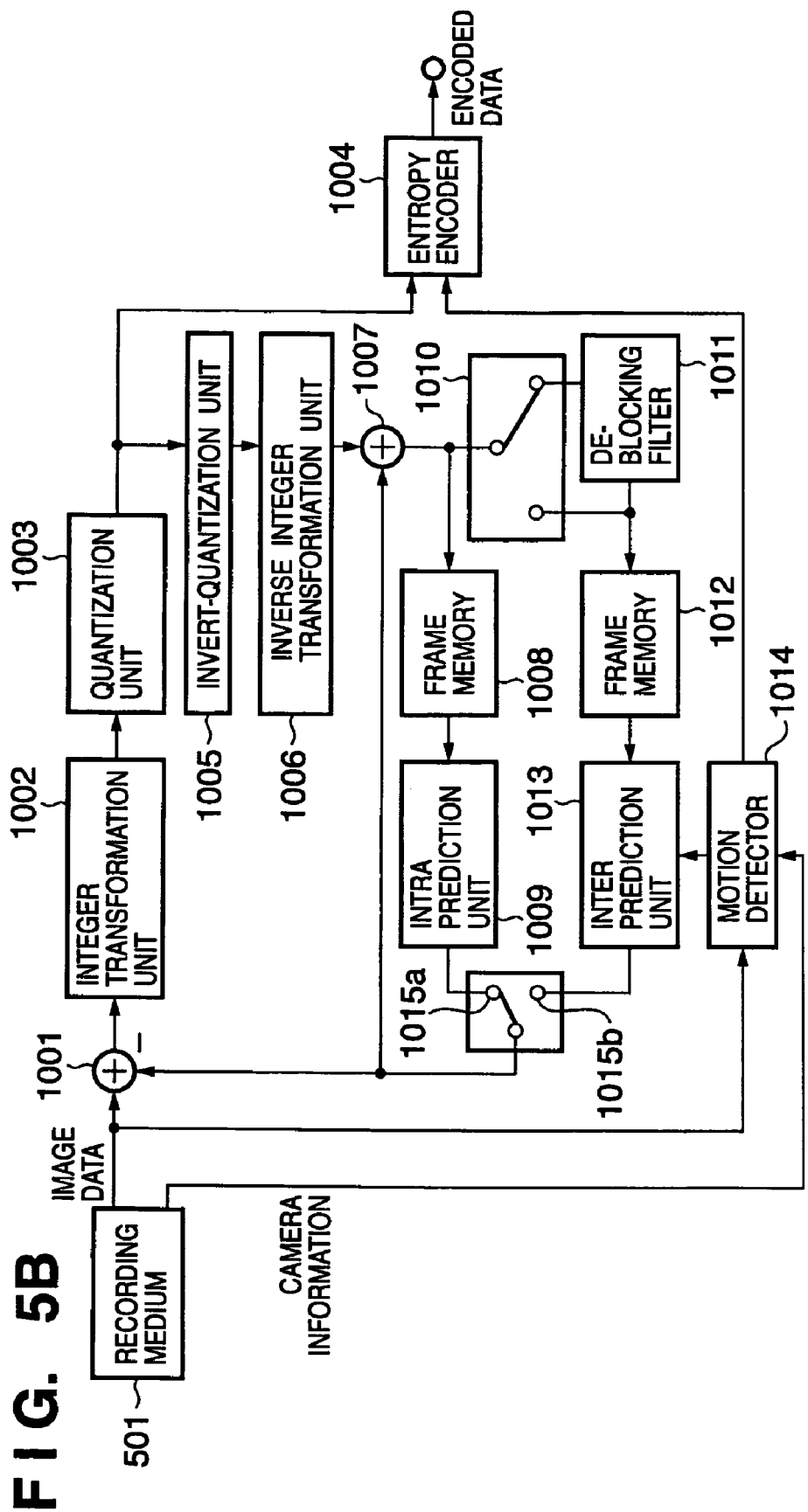
FIGS. 5A and 5B are block diagrams showing still another structural example of the image processing apparatus according to the embodiment of the present invention.

In the present embodiment, as indicated in steps S301 to S309 of FIG. 3, whether to permit or prohibit use of a sub macro block partition is determined based on camera information obtained from the camera unit 100. The processing is, however, not particularly limited. For example, permission/prohibition may be determined beforehand in the camera unit 100 and a determination result may be obtained from the camera unit 100, instead of camera information.

In the present embodiment, when it is expected from camera information that correct motion information cannot be obtained even by motion detection using fine pixel block shapes, motion detection on all the sub macro block partitions of three shapes is not executed. Needless to say, it is not always necessary to suspend motion detection on the three shapes. For example, motion detection may be suspended only on the smallest sub macro block partition of 4×4 pixels. Further, blocks where motion detection is suspended are not limited to the sub macro block partitions. Motion detection may be suspended on the macro block partitions but executed only on the largest macro block of 16×16 pixels.

Furthermore, camera information to be used is not limited to the foregoing camera information as long as a pixel block shape where correct motion detection is not executed is identified. For example, shutter speed information or the like of an image pickup device may be used.

Second Embodiment

Second Embodiment of the present invention will be described below.

Second Embodiment is suitable for reducing power consumption particularly when a "motion detector 1014" for executing motion detection for a plurality of pixel block shapes is implemented by hardware such as a digital circuit. The overall configuration including a camera unit of Second Embodiment is almost the same as First Embodiment of FIG. 1 and thus the specific explanation thereof is omitted.

In the present embodiment, a CPU (not shown) in an image processing apparatus sets "pixel block shape permission bit" for deciding, based on camera information, a pixel block shape to be used for motion detection in a plurality of pixel block shapes. Further, motion detection and motion vectors of a plurality of pixel blocks are evaluated by hardware.

Figure 6:
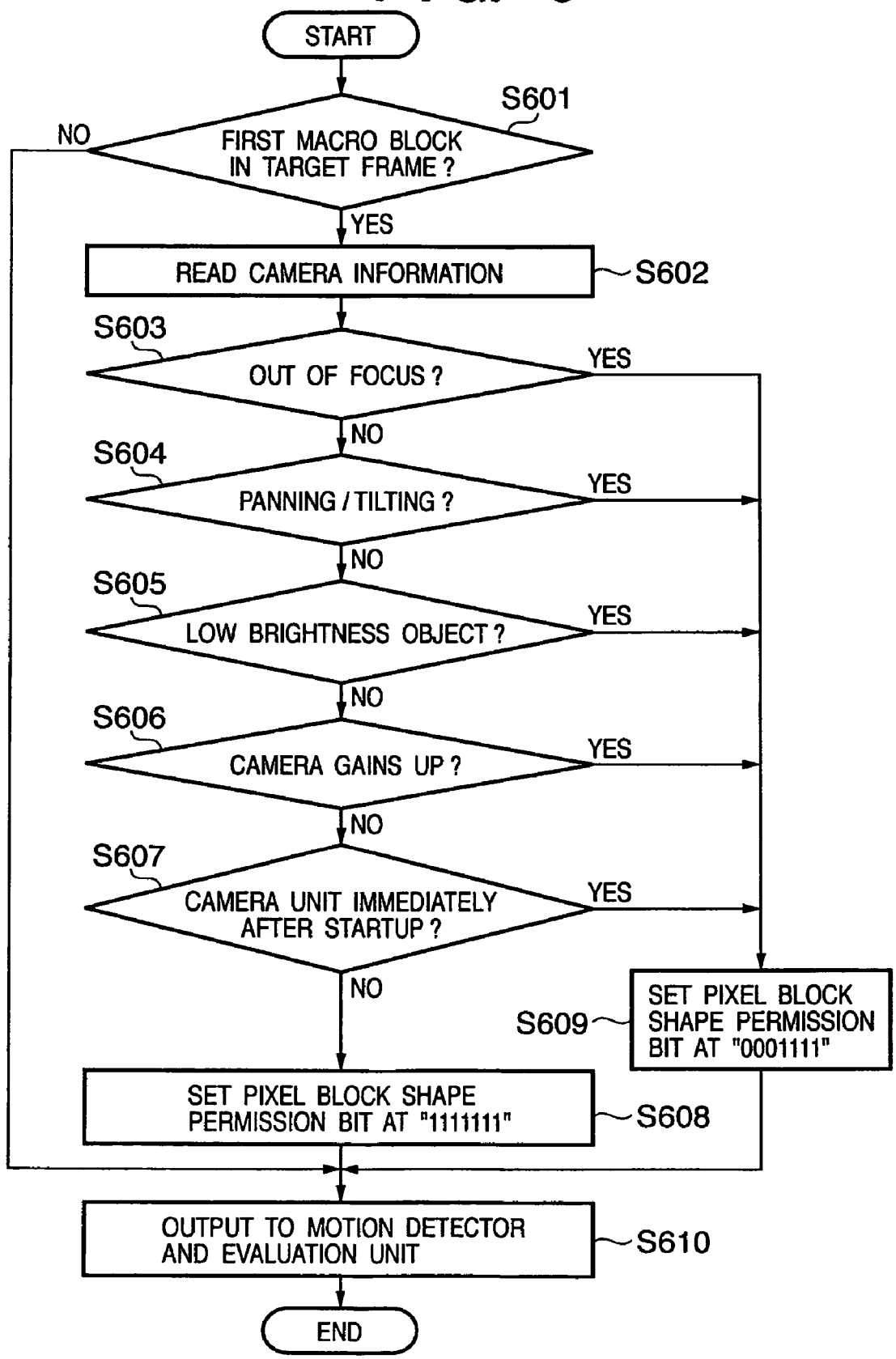
FIG. 6 is a flowchart corresponding to an example of motion detection according to Second Embodiment of the present invention.
Figure 7:
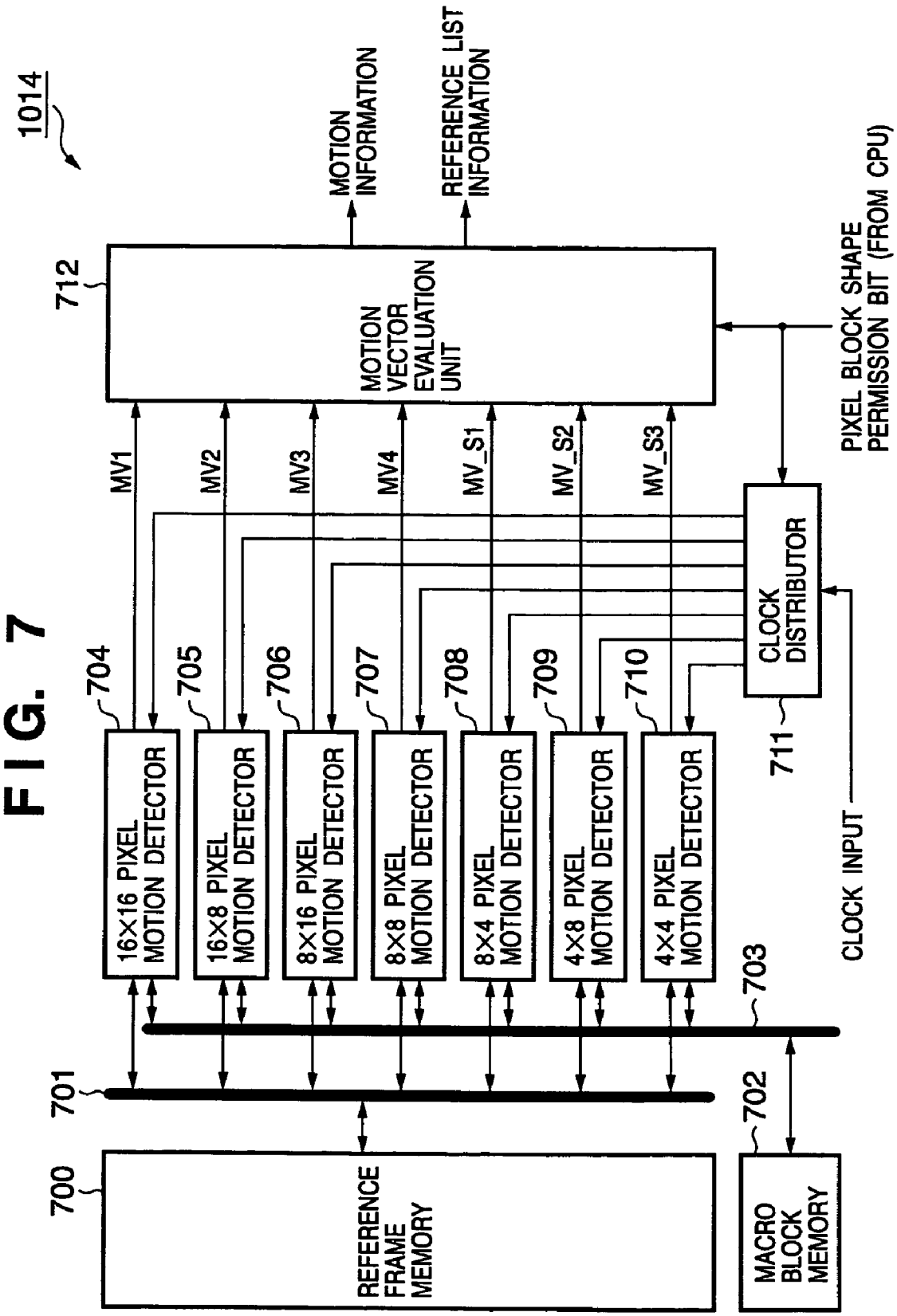
FIG. 7 is a block diagram showing an example of the configuration of a motion detector 1014 according to Second Embodiment of the present invention.
Figure 8:
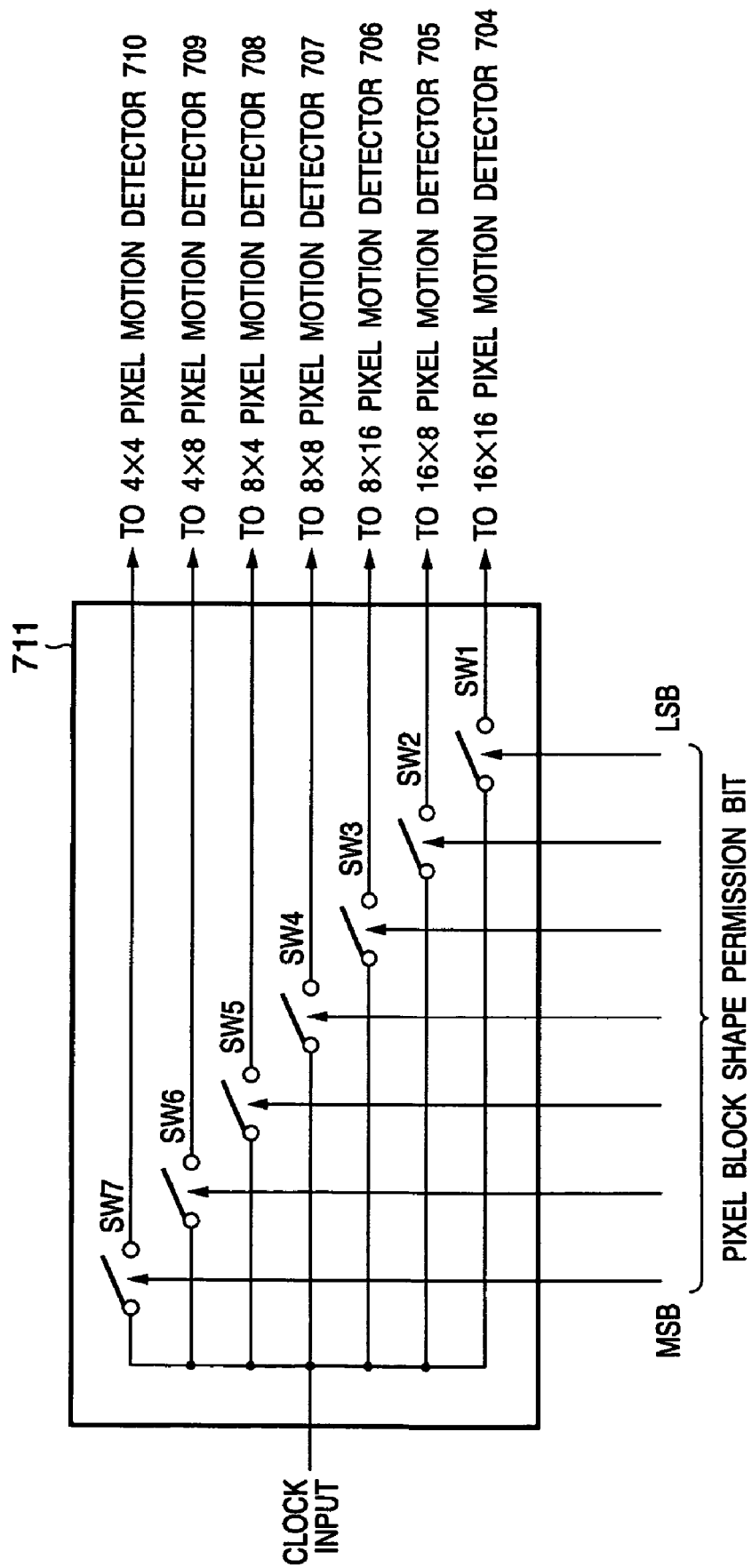
FIG. 8 is a block diagram showing an example of the configuration of a clock distributor 711 according to Second Embodiment of the present invention.

The flowchart of FIG. 6 shows the setting of "pixel block shape permission bits" in the CPU. FIGS. 7 and 8 show hardware blocks indicating the detailed configuration of a motion detector (corresponding to 1014 of FIG. 1) which operates according to the setting.

Referring to the flowchart of FIG. 6, the setting of "pixel block shape permission bits" in the CPU will be discussed below. In step S601 of FIG. 6, it is determined whether detection is the first motion detection in an image frame. When the first motion detection is executed on a new image frame ("YES" in step S601), the process proceeds to step S602. When detection is not the first motion detection ("NO" in step S601), the process proceeds to step S609. In step S602, camera information relating to focus control, vibration damping control, exposure control and so on is read.

In step S603, whether focus is achieved or not is determined based on focus control information in the camera information having been read in step S602. In step S604, it is determined whether a camera unit 100 pans or tilts, based on information relating to vibration damping control. In step S605, it is determined whether an object has a low brightness or not, based on information relating to exposure control. In step S606, it is determined whether the camera unit 100 gains up or not, based on the information relating to exposure control. In step S607, it is determined whether the camera unit 100 is in a state immediately after startup or not, based on information relating to the startup time of the camera unit 100.

The determination in steps S603 to S607 is similar to that of steps S303 to S307 shown in FIG. 3 of First Embodiment and thus the detailed explanation thereof is omitted.

When it is determined in steps S603 to S607 that the camera unit 100 is out of focus, pans/tilts, has a low-brightness object, gains up, or is in a state immediately after startup, the process proceeds to step S609. In step S609, "pixel block shape permission bits" are set at MSB"0001111"LSB.

These bits permit the operations of the motion detectors corresponding to sub macro block partitions and macro block partitions of 4×4 pixels, 4×8 pixels, 8×4 pixels, 8×8 pixels, 8×16 pixels, 16×8 pixels, and 16×16 pixels from MSB side. The "1" bit permits the motion detector to operate with the corresponding macro block partition and the "0" bit prohibits the operation of the motion detector.

When it is determined in steps S603 to S607 that the camera unit 100 is not out of focus, does not pan/tilt, does not have a low-brightness object, does not gain up, or is not in a state immediately after startup, the process proceeds to step S608. In step S608, "pixel block shape permission bits" are set at MSB"1111111"LSB. Then, in step S610, "pixel block shape permission bits" obtained thus are outputted to the motion detector 1014.

In this way, in steps S603 to S609 of the present embodiment, a pixel block shape to be used for motion detection is determined from two or more kinds of pixel block shapes based on camera information.

Referring to FIG. 7, the configuration of the motion detector 1014 will be discussed below according to the present embodiment. FIG. 7 is a block diagram showing an example of the detailed configuration of the motion detector 1014 for executing motion detection and evaluation using a plurality of pixel block shapes.

In FIG. 7, reference numeral 700 denotes a reference frame memory (corresponding to 1012 of FIG. 1) for storing two or more reference images. Reference numeral 701 denotes a data bus for exchanging data between the motion detectors and the reference frame memory. Reference numeral 702 denotes a macro block memory for storing the image data of a macro block where a motion vector should be determined. Reference numeral 703 denotes a data bus for exchanging data between the motion detectors and the macro block memory.

Reference numeral 704 denotes the motion detector for executing motion detection using a macro block of 16×16 pixels. As in First Embodiment, motion detection is executed on five reference frames at the maximum. Motion information relating to integer pixel accuracy, motion information relating to semi-pixel accuracy, and motion information relating to 1/4 pixel accuracy are calculated for each reference frame. The information with the strongest correlation is selected as the motion information of each frame. When the motion information of all reference frames is calculated, the motion information is evaluated for each reference frame. The information with the strongest correlation is selected, and reference frame information and motion information MV1 of a predictive encoding block are outputted.

Reference numeral 705 denotes the motion detector for executing motion detection using a macro block partition of 16×8 pixels. Motion information MV2 and reference frame information are similarly outputted. Reference numeral 706 denotes the motion detector for executing motion detection using a macro block partition of 8×16 pixels. Motion information MV3 and reference frame information are similarly outputted. Reference numeral 707 denotes the motion detector for executing motion detection using a macro block partition of 8×8 pixels. Motion information MV4 and reference frame information are similarly outputted. Reference numeral 708 denotes the motion detector for executing motion detection using a sub macro block partition of 8×4 pixels. Motion information MV_S1 and reference frame information are similarly outputted. Reference numeral 709 denotes the motion detector for executing motion detection using a sub macro block partition of 4×8 pixels. Motion information MV_S2 and reference frame information are similarly outputted. Reference numeral 710 denotes the motion detector for executing motion detection using a sub macro block partition of 4×4 pixels. Motion information MV_S3 and reference frame information are outputted.

Reference numeral 711 denotes a clock distributor for distributing clocks for operating the motion detectors 704 to 710. Reference numeral 712 denotes a vector evaluation unit for evaluating a motion vector and selecting the kind of partition of the macro block and sub macro block strongly correlated with the reference frame when the motion information MV1 to MV4 and SMV1 to SMV3 are calculated.

When the motion information is properly selected in the motion vector evaluation unit 712, reference list information for managing the reference relationship of all the predictive encoding blocks is also outputted based on the motion information in the selected macro block partition. When this processing is performed on all the pixels of the target frame, the motion detection of one frame is completed.

At this point, the values of "pixel block shape permission bits" determined by the processing of the flowchart of FIG. 6 are inputted to the clock distributor 711 and the vector evaluation unit 712.

FIG. 8 shows an example of the configuration of the clock distributor 711. In FIG. 8, clock input is connected to switches denoted as SW1 to SW7. Further, outputs from the switches SW1 to SW7 are outputted to the plurality of motion detectors denoted as 704 to 710 in FIG. 7. The switches SW1 to SW7 are turned on and the inputted clock is outputted to the connected motion detectors when the corresponding "macro block shape permission bits" are "1". The switches are turned off and the inputted clock is not outputted to the motion detectors when the corresponding "macro block shape permission bits" are "0".

As described above, the motion detectors 704 to 710 correspond to the two or more kinds of pixel block shapes. Only the motion detector fed with the clock is operated in response to the pixel block shape permission bit and the motion detector not fed with the clock is stopped. In FIG. 7, the motion vector evaluation unit 712 evaluates motion information by using only motion information and reference frame information outputted from the motion detector having "pixel block shape permission bit" of "1".

In other words, when it is determined that the camera unit 100 is out of focus, pans/tilts, has a low-brightness object, gains up, or is in a state immediately after startup, the CPU sets the values of "pixel block shape permission bits" at MSB"0001111"LSB and outputs the values to the motion detector 1014. Only the motion detectors having "pixel block shape permission bits" of "1" are operated and the other motion detectors are stopped. In this case, a clock is not inputted to the motion detector 710 of 4×4 pixels, the motion detector 709 of 4×8 pixels, and the motion detector 708 of 8×4 pixels and thus these motion detectors are stopped, thereby reducing unnecessary power consumption.

When it is determined that the camera unit 100 is out of focus, does not pan/tilt, does not have a low-brightness object, does not gain up, or is not in a state immediately after startup, the CPU sets the values of "pixel block shape permission bits" at MSB"1111111"LSB and outputs the values to the motion detector 1014. In this case, a clock is fed to all the motion detectors 704 to 710 and thus all the motion detectors are operated.

As described above, when it is determined based on camera information from the camera unit 100 that the camera unit 100 is out of focus, pans/tilts, has a low-brightness object, gains up, or is in a state immediately after startup and it is expected that correct motion information cannot be obtained even by motion detection using fine pixel blocks, it is possible to suppress processing of the unnecessary motion detection and reduce power consumption.

Figure 9:
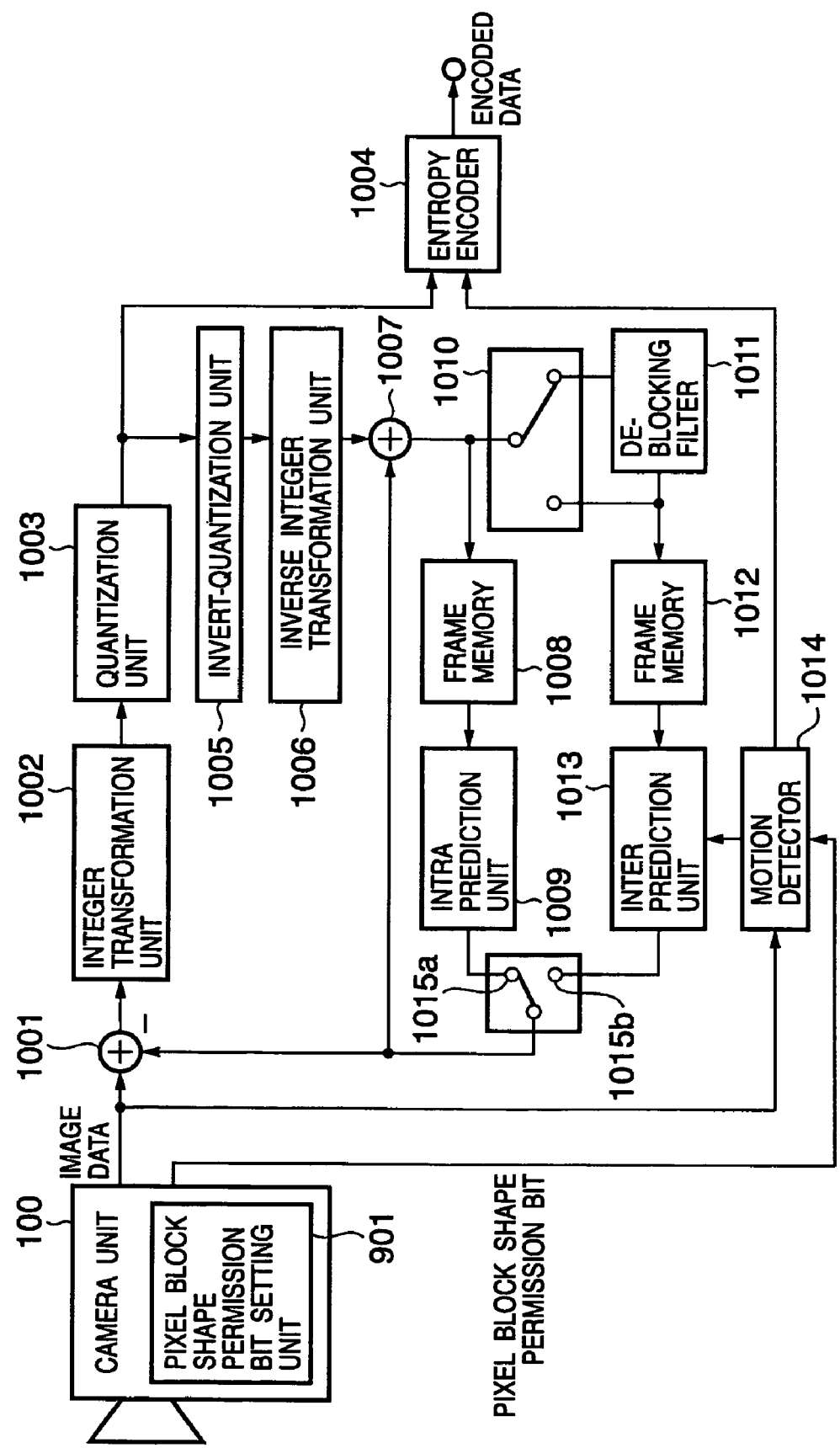
FIG. 9 is a block diagram showing another structural example of the image processing apparatus according to Second Embodiment of the present invention.

In the present embodiment, as indicated in steps S601 to S610 of FIG. 6, the CPU (not shown) in the image processing apparatus sets "pixel block shape permission bits" based on obtained camera information. Further, the configuration of FIG. 9 may be used: a camera CPU 109 of the camera unit 100 is caused to act as a image block shape permission bit setting unit 901, the pixel block shape permission bits are set beforehand in the camera unit 100, and only the values of "pixel block shape permission bits" are inputted to the motion detector 1014.

The present embodiment described an example in which the operation of the motion detector 1014 is stopped by suspending the supply of the clock. An object according to the present embodiment of the present invention is to stop the unnecessary operation of the motion detector and reduce power consumption. Means for attaining the object is not limited to the configuration of controlling the supply of a clock. For example, power supply to the motion detector 1014 may be interrupted. Even when a clock is continuously supplied to the motion detectors, power consumption can be substantially reduced by stopping the internal operations of the motion detectors. For example, the operations may be stopped using an enable signal or the like of a flip-flop circuit widely used for digital circuits.

Third Embodiment

Third Embodiment of the present invention will be described below.

The overall configuration including a camera unit of Third Embodiment is almost the same as First Embodiment of FIG. 1 and thus the detailed explanation thereof is omitted. The present embodiment is characterized in that when the kind of pixel block shape used for motion detection is changed based on camera information, the kinds of "some pixel block shapes" not being used for motion detection are changed according to a predetermined level of camera information.

As described in First Embodiment, the camera information includes various kinds of information relating to focus control, vibration damping control, exposure control, and so on. For the sake of simplicity, the present embodiment will discuss only a case of using information relating to vibration damping control.

Figure 10:
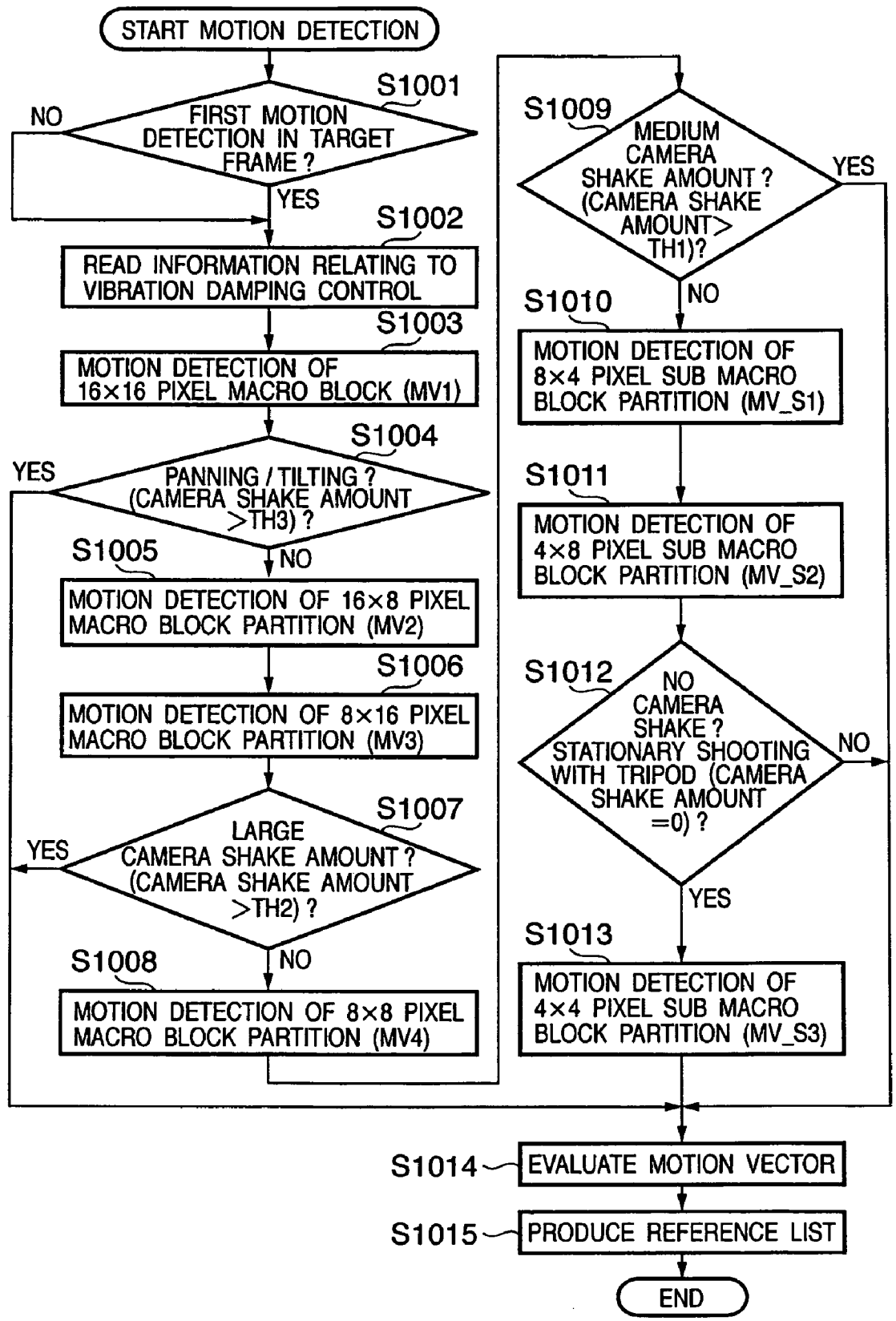
FIG. 10 is a flowchart corresponding to an example of motion detection according to Third Embodiment of the present invention.
Figure 11:
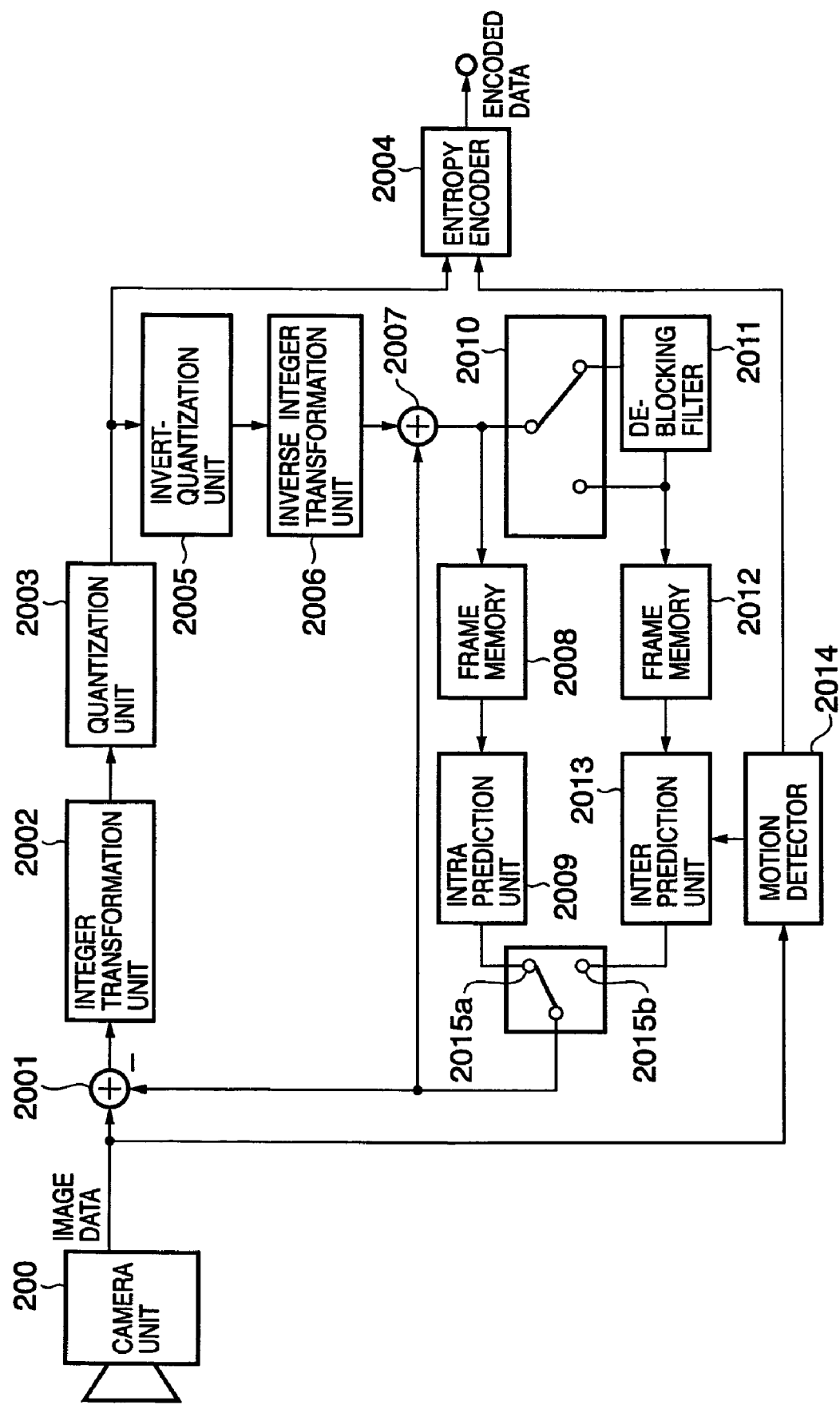
FIG. 11 is a block diagram showing a structural example of a conventional image processing apparatus.

Referring to the flowchart of FIG. 10, motion detection of the present embodiment will be discussed below. At the start of motion detection, in step S1001, it is determined whether detection is the first motion detection in a current frame. When it is determined that detection is not the first motion detection ("No" in step S1001), the process proceeds to step S1003. When it is determined that detection is the first motion detection in a new image frame ("YES" in step S1001), the process proceeds to step S1002 and information relating to vibration damping control is read.

In step S1003, motion detection is executed using a macro block of 16×16 pixels. Motion detection is executed on all reference frames where predictive encoding blocks can be referred. According to the standard of H.264, motion detection is executed on five reference frames at the maximum. Motion information relating to integer pixel accuracy, motion information relating to semi-pixel accuracy, and motion information relating to 1/4 pixel accuracy are calculated for each reference frame. The information with the strongest correlation is selected as the motion information of each frame. When the motion information of all reference frames is calculated, motion information is evaluated for each reference frame. The information with the strongest correlation is selected to determine motion information MV1 of a predictive encoding block.

In step S1004, it is determined whether a camera unit 100 pans or tilts, based on vibration damping control information having been read in step S1002. This determination is made by comparing "camera shake amount" of the camera unit 100 with a predetermined determination threshold value TH3. As described in First Embodiment, "camera shake amount" may be the output of a gyro sensor (not shown) generally used for the camera unit 100 of FIG. 2. In other words, "camera shake amount" may be the size or period of a periodic vertical or horizontal rotation component of camera shake made by a photographer.

In this case, when "camera shake amount" is extremely large and it is determined in step S1004 that "camera shake amount" is larger than TH3 ("YES" in step S1004), the process proceeds to step S1014 and motion detection is not executed using the other pixel block shapes. When it is determined that "camera shake amount" is not larger than TH3, ("NO" in step S1004), the process proceeds to step S1005. The size relationship of determination threshold values TH1, TH2, and TH3 compared with "camera shake amount" of FIG. 10 is expressed by Formula 1 below:

$$TH3 >> TH2 > TH1 \qquad \text{(Formula 1)}$$

In step S1005, motion detection is executed using a macro block partition of 16×8 pixels to determine motion information MV2. In step S1006, motion detection is executed using a macro block partition of 8×16 pixels to determine motion information MV3. In step S1007, it is determined whether "camera shake amount" is larger than the predetermined determination threshold value TH2. In this case, when it is determined that "camera shake amount" is larger than TH2 ("YES" in step S1007), the process proceeds to step S1014 and motion detection is not executed using the other pixel block shapes. When it is determined that "camera shake amount" is not larger than TH2, ("NO" in step S1007), the process proceeds to step S1008.

In step S1008, motion detection is executed using a macro block partition of 8×8 pixels to determine motion information MV4. In step S1009, it is determined whether "camera shake amount" is larger than the predetermined determination threshold value TH1. In this case, when it is determined that "camera shake amount" is larger than TH1 ("YES" in step S1009), the process proceeds to step S1014 and motion detection is not executed using the other pixel block shapes. When it is determined that "camera shake amount" is not larger than TH1 ("NO" in step S1009), the process proceeds to step S1010.

In step S1010, motion detection is executed using a sub macro block partition of 8×4 pixels to determine motion information MV_S1. In subsequent step S1011, motion detection is executed using a sub macro block partition of 4×8 pixels to determine motion information MV_S2. In step S1012, it is determined whether "camera shake amount" is 0 or not. When "camera shake amount" is not 0 ("NO" in step S1012), the process proceeds to step S1014 without executing motion detection of step S1013 using a sub macro block partition of 4×4 pixels. When "camera shake amount" is 0 ("YES" in step S1012), the process proceeds to step S1013. In step S1013, motion detection is executed using a sub macro block partition of 4×4 pixels to determine motion information MV_S3.

As described above, in an image processing apparatus according to the present embodiment, "camera shake amount" relating to vibration damping control is compared with the predetermined determination threshold values TH1, TH2, and TH3 to determine the level of "camera shake amount". The kind of pixel block shape used for motion detection is selected according to the level of the determined "camera shake amount."

In other words, according to the present embodiment of the present invention, when "camera shake amount" has the relationship of (Formula 2) below, motion detection is executed only using a macro block of 16×16 pixels.

When "camera shake amount" has the relationship of (Formula 3) below, motion detection is executed using macro block partitions of 16×16 pixels, 16×8 pixels, and 8×16 pixels.

When "camera shake amount" has the relationship of (Formula 4) below, motion detection is executed using macro block partitions of 16×16 pixels, 16×8 pixels, 8×16 pixels, and 8×8 pixels.

When "camera shake amount" has the relationship of (Formula 5) below, motion detection is executed using macro block partitions of 16×16 pixels, 16×8 pixels, 8×16 pixels, and 8×8 pixels and sub macro block partitions of 8×4 pixels and 4×8 pixels.

Finally, when "camera shake amount" has the relationship of (Formula 6) below, motion detection is executed using macro block partitions and sub macro block partitions of all the shapes.

$$\text{"Camera shake amount"} > TH3 \quad \text{(Formula 2)}$$

$$TH3 \geq \text{"camera shake amount"} > TH2 \quad \text{(Formula 3)}$$

$$TH2 \geq \text{"camera shake amount"} > TH1 \quad \text{(Formula 4)}$$

$$TH1 \geq \text{"camera shake amount"} > 0 \quad \text{(Formula 5)}$$

$$\text{"Camera shake amount"} = 0 \quad \text{(Formula 6)}$$

Thereafter, in the processing of step S1014, motion information MV1 to MV4 and MV_S1 to MV_V3 determined by the calculation are evaluated. In this evaluation, macro block and sub macro block partitions are selected which are strongly correlated with the reference frame at the calculation of the motion information MV1 to MV4 and SMV1 to SMV3.

When motion information is properly selected, a reference list is produced in step S1015 based on the motion information in the selected macro block partition to manage the reference relationship of all the predictive encoding blocks. When this processing is performed on all the pixels of the target frame, the motion detection of one frame is completed.

In this way, the range of the values of camera information is determined in the present embodiment. In steps S1003 to S1013, a pixel block shape to be used for motion detection is determined from two or more kinds of pixel block shapes based on the range of the camera information.

As described above, when the kind of pixel block shape used for motion detection is changed based on camera information, the kind of pixel block shape is changed according to the size or level of predetermined camera information as necessary, thereby suppressing processing of unnecessary motion detection which actually obtains no correct motion information. Therefore, it is possible to reduce the processing load of motion detection.

In the present embodiment, when "camera shake amount" has the relationship of Formula 6, motion detection is executed using macro block partitions and sub macro block partitions of all the shapes. When information enabling the identification of a state such as stationary shooting using a tripod is obtained from the camera unit, the information may be used.

When "camera shake amount" keeps the relationship of Formula 6 for a predetermined time or longer, motion detection may be executed using macro block partitions and sub macro block partitions of all the shapes.

The present embodiment described only information relating to vibration damping control. For example, the information may be continuously changed using the level of the amplifier gain of the camera unit, the focus level of autofocus, and so on. It is needless to say that even when the information is continuously changed according to the level of a value obtained by calculating two or more camera information, the information falls within the scope of the present embodiment.

According to the present embodiment, it is possible to provide an image processing apparatus which can execute optimum motion detection while reducing an unnecessary processing load.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-071737 filed on Mar. 14, 2005, which are hereby incorporated by reference herein in its entirety.

What is claimed is:

1. An image processing apparatus, comprising:
   an obtaining unit operable to obtain moving image data having been obtained in a shooting unit for shooting an object and shooting information relating to a condition of the shooting unit during the shooting;
   an encoder operable to execute
   at least inter-frame predictive encoding on the moving image data; and
   a motion detection unit operable to execute motion detection on the moving image data by means of two or more kinds of pixel block shapes and supply motion information to the encoder based on a result of the motion detection,
   wherein the motion detection unit includes a determination unit that receives the shooting information and determines, based on the shooting information, whether to execute motion detection using all the kinds of pixel block shapes, and
   wherein when the determination unit determines that motion detection should not be executed using all the kinds of pixel block shapes, the motion detection unit executes the motion detection using some of the kinds of pixel block shapes.

2. The image processing apparatus according to claim 1, wherein the determination unit comprises a first decision unit operable to decide, based on the shooting information, a pixel block shape to be used for the motion detection from the two or more kinds of pixel block shapes, and
   when the determination unit determines that motion detection should not be executed using all the kinds of pixel block shapes, the motion detection unit executes the motion detection using the pixel block shape having been decided by the first decision unit.

3. The image processing apparatus according to claim 2, wherein the motion detection unit comprises motion detectors corresponding to the two or more kinds of pixel block shapes, and
   when the motion detection is executed using the pixel block shape having been decided by the first decision unit, only the motion detector corresponding to the decided pixel block shape is operated and the other motion detectors are stopped.

4. The image processing apparatus according to claim 1, wherein the determination unit comprises a second decision unit operable to determine a range of values of the shooting information and deciding, according to the range of the shooting information, a pixel block shape to be used for the motion detection from the two or more kinds of pixel block shapes, and
when the determination unit determines that motion detection should not be executed using all the kinds of pixel block shapes, the motion detection unit executes the motion detection using the pixel block shape having been decided by the second decision unit.

5. The image processing apparatus according to claim 4, wherein the motion detection unit comprises motion detectors corresponding to the two or more kinds of pixel block shapes, and
when the motion detection is executed using the pixel block shape having been decided by the second decision unit, only the motion detector corresponding to the decided pixel block shape is operated and the other motion detectors are stopped.

6. The image processing apparatus according to claim 1, wherein when the determination unit determines that motion detection should not be executed using all the kinds of pixel block shapes, the pixel block shape used for the motion detection in the motion detection unit does not include at least a smallest pixel block shape of the two or more kinds of pixel block shapes.

7. The image processing apparatus according to claim 1, wherein the shooting information includes one of information relating to focus control, information relating to vibration damping and pan/tilt in the shooting unit, information relating to exposure control, and time information relating to lapse of time from startup of the shooting unit, in the shooting unit.

8. An apparatus comprising a processor and a memory storing a program executable by the processor, wherein the program includes computer code for implementing a method for image processing, the method including steps of:
an obtaining step of obtaining moving image data having been obtained in a shooting unit for shooting an object and shooting information relating to a condition of the shooting unit during the shooting;
an encoding step of executing
at least inter-frame predictive encoding on the moving image data; and
a motion detection step of executing motion detection on the moving image data by means of two or more kinds of pixel block shapes and supply motion information used by the encoding step based on a result of the motion detection,
wherein the motion detection step includes a determination step of receiving the shooting information and determines, based on the shooting information, whether to execute motion detection using all the kinds of pixel block shapes, and
wherein when it is determined in the determination step that motion detection should not be executed using all the kinds of pixel block shapes, the motion detection is executed using some of the kinds of pixel block shapes in the encoding step.

9. The apparatus according to claim 8, wherein the determination step comprises a first decision step of deciding, based on the shooting information, a pixel block shape to be used for the motion detection from the two or more kinds of pixel block shapes, and
when it is determined in the determination step that motion detection should not be executed using all the kinds of pixel block shapes, the motion detection is executed in the encoding step by using the pixel block shape having been decided in the first decision step.

10. The apparatus according to claim 9, wherein the encoding step comprises motion detecting steps corresponding to the two or more kinds of pixel block shapes, and
when the motion detection is executed using the pixel block shape having been decided in the first decision step, only the motion detecting step corresponding to the decided pixel block shape is operated and the other motion detecting steps are stopped.

11. The apparatus according to claim 8, wherein the determination step comprises a second decision step of determining a range of values of the shooting information and deciding, according to the range of the shooting information, a pixel block shape to be used for the motion detection from the two or more kinds of pixel block shapes, and
when it is determined in the determination step that motion detection should not be executed using all the kinds of pixel block shapes, the motion detection is executed in the encoding step by using the pixel block shape having been decided in the second decision step.

12. The apparatus according to claim 11, wherein the encoding step comprises motion detecting steps corresponding to the two or more kinds of pixel block shapes, and
when the motion detection is executed using the pixel block shape having been decided in the second decision step, only the motion detecting step corresponding to the decided pixel block shape is operated and the other motion detecting steps are stopped.

13. The apparatus according to claim 8, wherein when it is determined in the determination step that motion detection should not be executed using all the kinds of pixel block shapes, the pixel block shape used for the motion detection in the encoding step does not include at least a smallest pixel block shape of the two or more kinds of pixel block shapes.

14. The apparatus according to claim 8, wherein the shooting information includes one of information relating to focus control, information relating to vibration damping and pan/tilt, information relating to exposure control, and time information relating to lapse of time from startup of the shooting unit, in the shooting unit.

15. A non-transitory computer-readable memory having stored thereon sequences of instructions which when executed by a computer causes the computer to execute an image processing method comprising:
an obtaining step of obtaining moving image data having been obtained in a shooting unit for shooting an object and shooting information relating to a condition of the shooting unit during the shooting;
an encoding step of executing
at least inter-frame predictive encoding on the moving image data; and
a motion detection step of executing motion detection on the moving image data by means of two or more kinds of pixel block shapes and supply motion information used by the encoding step based on a result of the motion detection,
wherein the motion detection step includes a determination step of receiving the shooting information and determines, based on the shooting information, whether to execute motion detection using all the kinds of pixel block shapes, and wherein when it is determined in the determination step that motion detection should not be executed using all the kinds of pixel block shapes, the motion detection is executed using some of the kinds of pixel block shapes in the encoding step.

16. The computer-readable medium according to claim 15, wherein the determination step comprises a first decision step of deciding, based on the shooting information, a pixel block shape to be used for the motion detection from the two or more kinds of pixel block shapes, and when it is determined in the determination step that motion detection should not be executed using all the kinds of pixel block shapes, the motion detection is executed in the encoding step by using the pixel block shape having been decided in the first decision step.

17. The computer-readable medium according to claim 16, wherein the encoding step comprises motion detecting steps corresponding to the two or more kinds of pixel block shapes, and when the motion detection is executed using the pixel block shape having been decided in the first decision step, only the motion detecting step corresponding to the decided pixel block shape is operated and the other motion detecting steps are stopped.

18. The computer-readable medium according to claim 15, wherein the determination step comprises a second decision step of determining a range of values of the shooting information and deciding, according to the range of the shooting information, a pixel block shape to be used for the motion detection from the two or more kinds of pixel block shapes, and when it is determined in the determination step that motion detection should not be executed using all the kinds of pixel block shapes, the motion detection is executed in the encoding step by using the pixel block shape having been decided in the second decision step.

19. The computer-readable medium according to claim 18, wherein the encoding step comprises motion detecting steps corresponding to the two or more kinds of pixel block shapes, and when the motion detection is executed using the pixel block shape having been decided in the second decision step, only the motion detecting step corresponding to the decided pixel block shape is operated and the other motion detecting steps are stopped.

20. The computer-readable medium according to claim 15, wherein when it is determined in the determination step that motion detection should not be executed using all the kinds of pixel block shapes, the pixel block shape used for the motion detection in the encoding step does not include at least a smallest pixel block shape of the two or more kinds of pixel block shapes.

21. The computer-readable medium according to claim 15, wherein the shooting information includes one of information relating to focus control, information relating to vibration damping and pan/tilt, information relating to exposure control, and time information relating to lapse of time from startup of the shooting unit, in the shooting unit.

* * * * *